(12) United States Patent
Tilton

(10) Patent No.: US 7,650,902 B1
(45) Date of Patent: Jan. 26, 2010

(54) LIQUID THERMAL MANAGEMENT PURGING SYSTEM

(75) Inventor: Charles L. Tilton, Liberty Lake, WA (US)

(73) Assignee: Isothermal Systems Research, Inc., Liberty Lake, WA (US)

( * ) Notice: Subject to any disclaimer, the term of this patent is extended or adjusted under 35 U.S.C. 154(b) by 540 days.

(21) Appl. No.: 11/617,607

(22) Filed: Dec. 28, 2006

(51) Int. Cl.
*B01D 17/02* (2006.01)

(52) U.S. Cl. .............. 137/172; 137/565.17; 137/565.29

(58) Field of Classification Search ................. 137/172, 137/15.05, 15.16, 565.17, 154, 205–209, 137/565.01, 565.29; 184/1.5; 141/59, 65, 141/98

See application file for complete search history.

(56) References Cited

U.S. PATENT DOCUMENTS 2,817,396 A * 12/1957 Booth ........................ 137/563

* cited by examiner

*Primary Examiner*—John Rivell
*Assistant Examiner*—Craig M Schneider
(74) *Attorney, Agent, or Firm*—Michaels S. Neustel

(57) ABSTRACT

A liquid thermal management purging system for efficiently removing the liquid coolant within a liquid thermal management system prior to opening the system for maintenance. The liquid thermal management purging system generally includes a reservoir storing a volume of liquid coolant and a volume of displacement liquid and a thermal management unit in fluid communication with the reservoir. A displacement pump and a drain pump are fluidly connected between the reservoir and the thermal management unit to selectively provide displacement liquid to and remove liquid coolant from the thermal management unit (and vice-versa).

25 Claims, 7 Drawing Sheets

LIQUID THERMAL MANAGEMENT PURGING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to liquid thermal management systems that thermally manage heat producing devices and more specifically it relates to a liquid thermal management purging system for efficiently removing the liquid coolant within a liquid thermal management system prior to opening the system for maintenance.

2. Description of the Related Art

Any discussion of the prior art throughout the specification should in no way be considered as an admission that such prior art is widely known or forms part of common general knowledge in the field.

Modern electronic devices (e.g. microprocessors, circuit boards and power supplies) and other heat producing devices have significant thermal management requirements. Conventional dry thermal management technology (e.g. forced air convection using fans and heat sinks) simply is not capable of efficiently thermally managing modern electronics.

Single-phase liquid thermal management systems (e.g. liquid cold plates) and multi-phase liquid thermal management systems (e.g. spray cooling, pool boiling, flow boiling, jet impingement cooling, falling-film cooling, parallel forced convection, curved channel cooling and capillary pumped loops) have been in use for years for thermally managing various types of heat producing devices.

Spray cooling technology is being adopted today as the most efficient option for thermally managing electronic systems. U.S. Pat. No. 5,220,804 entitled High Heat Flux Evaporative Spray Cooling to Tilton et al. describes the earlier versions of spray technology, as it relates to cooling electronics. U.S. Pat. No. 6,108,201 entitled Fluid Control Apparatus and Method for Spray Cooling to Tilton et al. also describes the usage of spray technology to cool a printed circuit board.

The liquid coolant typically used within a spray cooling system is a dielectric fluid (e.g. perfluorocarbons and hydrofluoroethers) having a low vaporization temperature at standard atmospheric pressure. One common brand of dielectric liquid coolant for two-phase thermal management systems is a perfluorocarbon manufactured by Minnesota Mining and Manufacturing Company (3M®) under the federally registered trademark FLUORINERT®. Unfortunately, perfluorocarbons have relatively high global warming potentials (GWP). For example, the perfluorocarbon PF-5070 (manufactured by 3M) has a GWP exceeding 5,000 (100-yr-ITH).

BRIEF SUMMARY OF THE INVENTION

The general purpose of the present invention is to provide a liquid thermal management purging system that has many of the advantages of the liquid thermal management systems mentioned heretofore. The invention generally relates to a liquid thermal management system which includes a reservoir storing a volume of liquid coolant and a volume of displacement liquid and a thermal management unit in fluid communication with the reservoir. A displacement pump and a drain pump are fluidly connected between the reservoir and the thermal management unit to selectively provide displacement liquid to and remove liquid coolant from the thermal management unit (and vice-versa).

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a liquid thermal management purging system for efficiently removing the liquid coolant within a liquid thermal management system prior to opening the system for maintenance.

Another object is to provide a liquid thermal management purging system that reduces the amount of coolant lost because of evaporation, spillage or physical displacement during maintenance of a liquid thermal management system (e.g. replacement of a component).

An additional object is to provide a liquid thermal management purging system that reduces the exposure of maintenance personnel to coolant vapors during maintenance routines.

An additional object is to provide a liquid thermal management purging system that reduces the loss of high global warming potential (GWP) fluids to the atmosphere.

A further object is to provide a liquid thermal management purging system that efficiently removes liquid coolant from a liquid thermal management system.

Another object is to provide a liquid thermal management purging system that may be utilized in various types of liquid thermal management systems including single-phase and multi-phase.

Another object is to provide a liquid thermal management purging system that replaces a liquid coolant with a low GWP displacement liquid.

A further object is to provide a liquid thermal management purging system that efficiently transfers heat from the liquid coolant.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
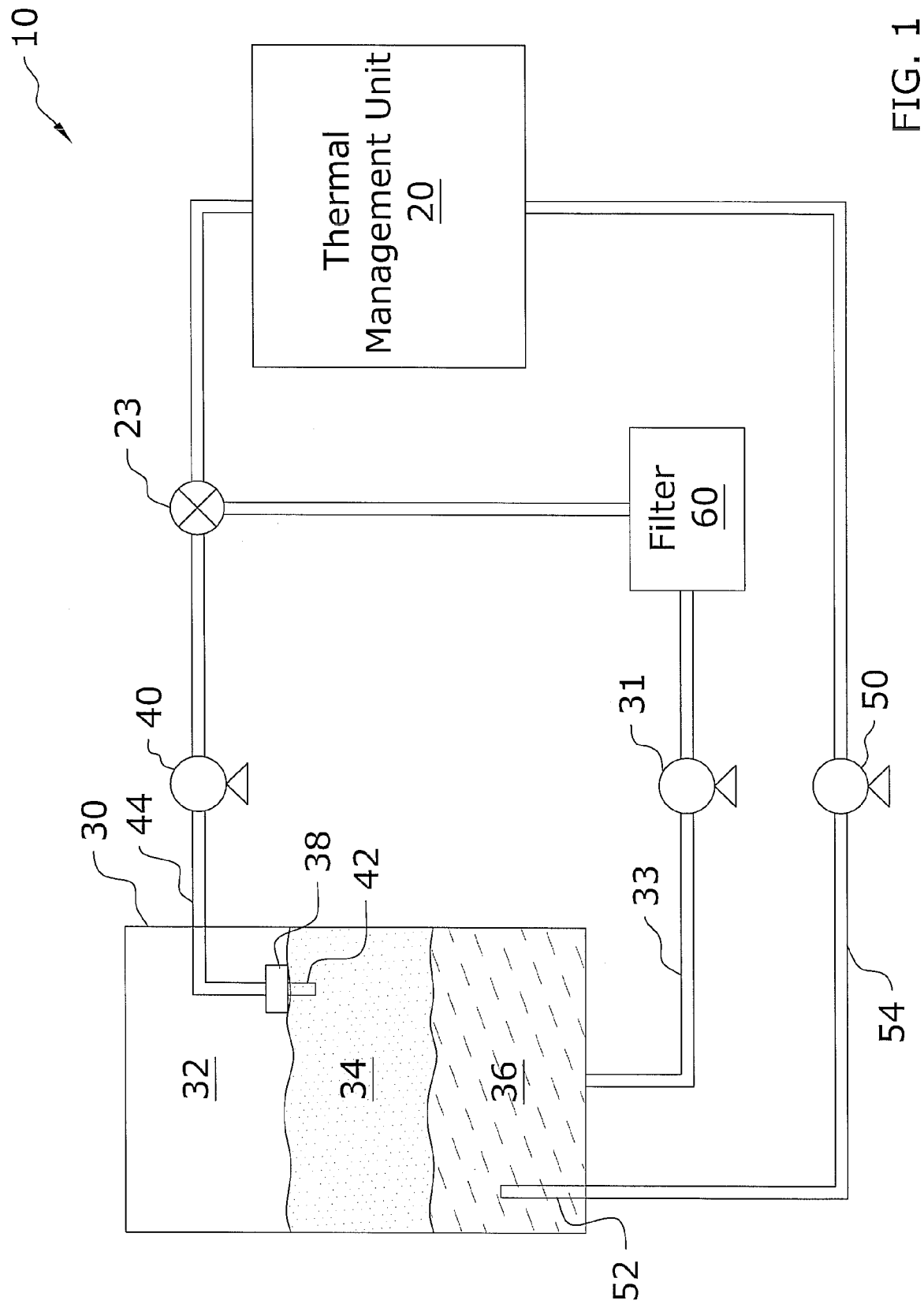
FIG. 1 is a block diagram illustrating a preferred embodiment of the liquid thermal management purging system.
Figure 2:
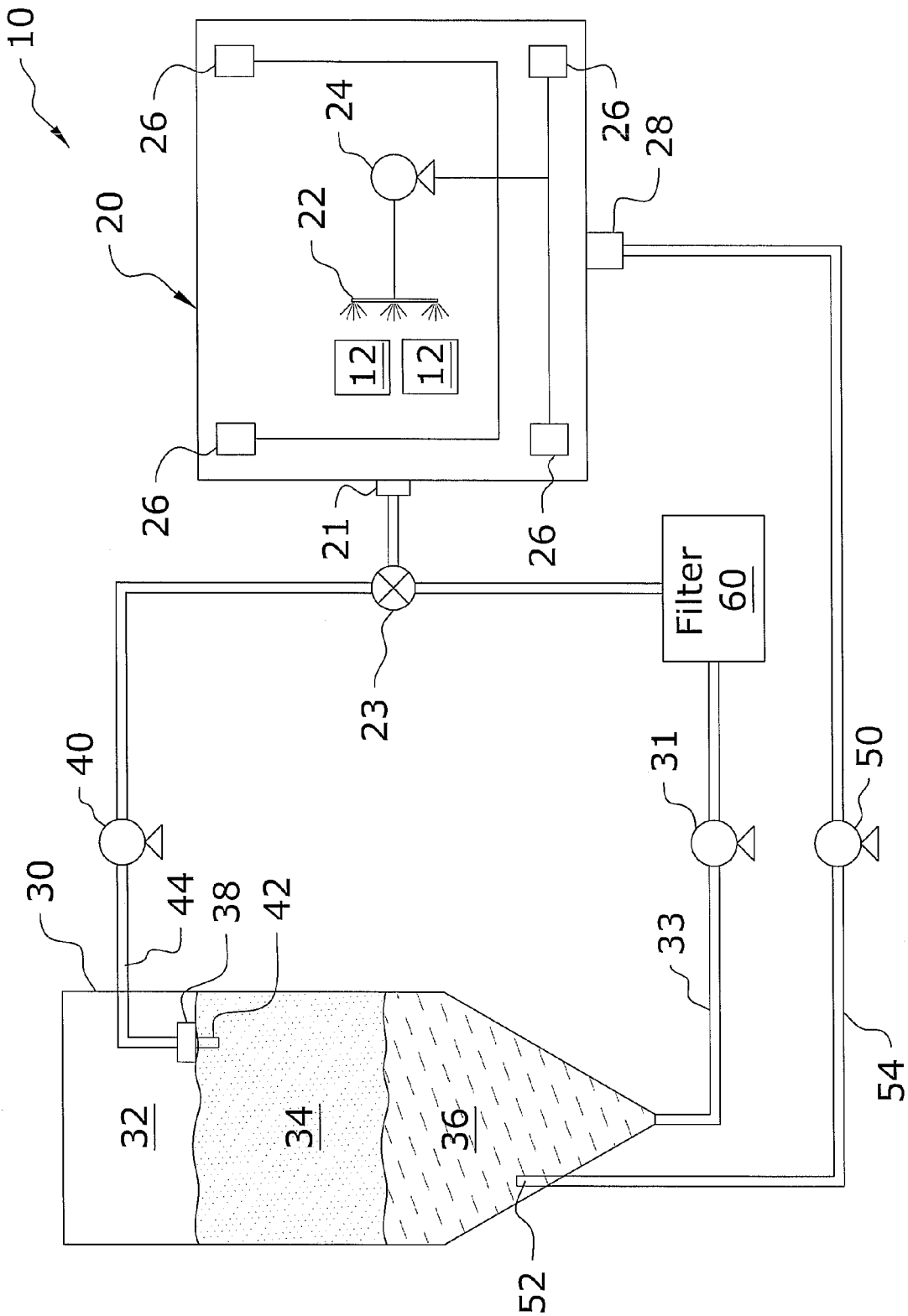
FIG. 2 is a more detailed block diagram illustrating the reservoir and the thermal management unit fluid connections.

Turning now descriptively to the drawings, in which similar reference characters denote similar elements throughout the several views, FIGS. 1 through 6 illustrate a liquid thermal management purging system 10, which comprises a reservoir 30 storing a volume of liquid coolant 36 and a volume of displacement liquid 34 and a thermal management unit 20 in fluid communication with the reservoir 30. A displacement pump and a drain pump 50 are fluidly connected between the reservoir 30 and the thermal management unit 20 to selectively provide displacement liquid 34 to and remove liquid coolant 36 from the thermal management unit 20 (and vice-versa).

B. Reservoir

FIGS. 1 through 5 illustrate a reservoir 30 for use in the present invention. The reservoir 30 includes an interior chamber capable of receiving and storing a volume of liquid. The reservoir 30 is preferably capable of storing a volume of liquid of at least two times the volume of liquid coolant 36 typically used within the liquid thermal management system, however the reservoir 30 may store a smaller volume of liquid. A head space 32 is formed above the displacement liquid 34 as illustrated in FIGS. 1 through 5 of the drawings.

The reservoir 30 is preferably externally positioned from the thermal management unit 20 as shown in FIGS. 1 through 5 of the drawings, however the reservoir 30 may be positioned internally of the thermal management unit 20. In addition, the reservoir 30 may be fluidly connected to one or more thermal management units 20 to allow for the maintenance of one or more thermal management systems.

The reservoir 30 may be comprised of a permanent apparatus or a portable apparatus. It is preferable that the reservoir 30 is comprised of a portable apparatus to allow for active draining and filling of a thermal management unit 20 by a service technician.

C. Liquid Coolant

The liquid coolant 36 may be comprised of various types of conventional coolants used to thermally manage heat producing devices 12 (e.g. electronic devices). The liquid coolant 36 is preferably comprised of a dielectric fluid such as but not limited to perfluorocarbons and hydrofluoroethers.

One suitable brand of dielectric liquid coolant 36 for two-phase thermal management systems is FLUORINERT® PF-5070, a perfluorocarbon manufactured by Minnesota Mining and Manufacturing Company (3M®). FLUORINERT PF-5070 has a density of approximately 0.0625 pounds per cubic inch at 25° Celsius and 1 atmosphere pressure.

D. Displacement Liquid

The displacement liquid 34 is preferably comprised of a low GWP dielectric liquid to allow for maintenance personnel to work on the liquid thermal management unit 20 without losing the liquid coolant 36, which can have a high GWP, to the atmosphere. The displacement liquid 34 is preferably immiscible with the liquid coolant 36 and separable from the liquid coolant 36 via a filter 60 and/or gravity separation. In particular, the displacement liquid 34 preferably has a density different from the liquid coolant 36 to allow for gravity separation of the liquid coolant 36 and the displacement liquid 34 within the reservoir 30 as illustrated in FIGS. 1 through 5 of the drawings.

The density of the liquid coolant 36 is preferably higher than a density of the displacement liquid 34 as liquid coolants 36 such as perfluorocarbons and hydrofluoroethers are relatively dense liquids. For example, the density of the perfluorocarbon PF-5070 manufactured by 3M is 1.73 g/ml and the density of the hydrofluroether (HFE) NOVEC 7200 manufactured by 3M is 1.43 g/ml. Alternatively, the displacement liquid 34 can have a higher density than the liquid coolant 36. The displacement liquid 34 may be comprised of various low GWP liquids such as but not limited to Dow Corning's OS-10 (0.76 g/ml) or Dow Corning's 200® Fluid (0.96 g/ml).

When the liquid coolant 36 is denser than the displacement liquid 34, the liquid coolant 36 gravity separates to a lower portion of the reservoir 30 and the displacement liquid 34 gravity separates to above the liquid coolant 36 as shown in FIGS. 1 through 5 of the drawings. In addition, a displacement liquid 34 that is less dense than the liquid coolant 36 will rise above any remaining liquid coolant 36 in the thermal management unit 20 thereby covering the liquid coolant 36 and preventing the vaporization of the liquid coolant 36 when the thermal management unit 20 is opened for maintenance.

E. Thermal Management Unit

FIGS. 1 through 5 illustrate a basic thermal management unit 20. The thermal management unit 20 is preferably comprised of a multi-phase spray cooling technology such as illustrated in FIGS. 2 through 5 of the drawings, however the thermal management unit 20 may also be comprised of single phase technology (e.g. liquid immersion or flow through liquid cooling).

The thermal management unit 20 is preferably fluidly connected to a heat exchanger or other thermal conditioning unit to remove heat from the liquid coolant 36. Alternatively, the reservoir 30 may be utilized as a heat exchanger by circulating the liquid coolant 36 back to the reservoir 30 and allowing the heat to transfer to the displacement liquid 34 before returning to the thermal management unit 20.

U.S. Pat. No. 5,220,804 entitled High Heat Flux Evaporative Spray Cooling to Tilton et al. describes the earlier versions of spray technology, as it relates to cooling electronics and U.S. Pat. No. 6,108,201 entitled Fluid Control Apparatus and Method for Spray Cooling to Tilton et al. also describes the usage of spray technology to cool a printed circuit board which are both incorporated by reference herein.

F. Displacement Liquid Transfer System

A first line 44 is fluidly connected to the reservoir 30 in a location on the reservoir 30 to draw the displacement liquid 34 as shown in FIGS. 1 through 5 of the drawings. For example, if the displacement liquid 34 has a density less than the density of the liquid coolant 36, then the intake opening 42 of the first line 44 is preferably positioned within an upper portion of the reservoir 30 or at least in a portion above the liquid coolant 36.

It is preferable that the first line 44 extend into the interior of the reservoir 30 as shown in FIGS. 1 through 5 of the drawings. The first line 44 is also preferably fluidly connected to an inlet port 21 on the thermal management unit 20. It is further preferable that the portion of the first line 44 within the reservoir 30 is vertically adjustable so that the intake opening 42 of the first line 44 is above the separation line between the liquid coolant 36 and the displacement liquid 34 when the displacement liquid 34 is above the liquid coolant 36 as shown in FIGS. 1 through 5 of the drawings.

The first line 44 may be comprised of a flexible structure or other vertically adjustable structure that is movable within the reservoir 30 based upon the upper level of the displacement liquid 34 to ensure that intake opening 42 does not enter the volume of liquid coolant 36. It is preferable that a float 38 is attached to the first line 44 above the intake opening 42, wherein the float 38 is buoyant within the displacement liquid 34 and maintains the intake opening 42 at a relatively constant depth within the displacement liquid 34 as shown in FIGS. 1 through 5 of the drawings. It is further preferable that the intake opening 42 of the first line 44 is positioned away from a vertical path of outlet of the second line 33 to reduce contamination of the displacement liquid 34 drawn into the first line 44 by the returned liquid coolant 36.

As shown in FIGS. 1 through 5 of the drawings, a first pump 40 is fluidly connected to the intake tube and the thermal management unit 20 to provide the displacement liquid 34 to the thermal management unit 20. The inlet of the first pump 40 is connected to the intake tube and the outlet of the first pump 40 is connected to the thermal management unit 20. The outlet of the first pump 40 may be directly connected to the thermal management unit 20 or connected to a valve 23 that controls the flow of liquid coolant 36 or displacement liquid 34 to the thermal management unit 20 as shown in FIGS. 1 through 4 of the drawings.

G. Liquid Coolant Transfer System

As shown in FIGS. 1 through 5 of the drawings, a second line 33 is fluidly connected to the reservoir 30 in a location to draw the liquid coolant 36 from within the reservoir 30. For example, if the displacement liquid 34 has a density less than the density of the liquid coolant 36, then the intake of the second line 33 is preferably positioned within a lower portion of the reservoir 30 or at least in a portion below the displacement liquid 34.

A second pump 31 is fluidly connected to the second line 33 and the thermal management unit 20 to provide the liquid coolant 36 to the thermal management unit 20 as shown in FIGS. 1 through 5 of the drawings. The inlet of the second pump 31 is connected to the reservoir 30 and the outlet of the second pump 31 is connected to the thermal management unit 20. The outlet of the second pump 31 may be directly connected to the thermal management unit 20 or connected to a valve 23 that controls the flow of liquid coolant 36 or displacement liquid 34 to the thermal management unit 20 as shown in FIGS. 1 through 4 of the drawings.

A filter 60 is preferably fluidly positioned within the second line 33 to remove any displacement liquid 34 that may be present in the liquid coolant 36 prior to transferring the liquid coolant 36 to the thermal management unit 20 as shown in FIGS. 1 through 5 of the drawings. The filter 60 may be comprised of any device capable of filtering the displacement liquid 34 from the liquid coolant 36 via various filtering technologies.

H. Drain System

A drain line 54 is preferably fluidly connected to the thermal management unit 20 and the reservoir 30 to transfer a liquid (e.g. the displacement liquid 34, the liquid coolant 36 or both) within the thermal management unit 20 to the reservoir 30 as shown in FIGS. 1 through 5 of the drawings. The drain line 54 allows for a complete or substantial removal of all fluids within the thermal management unit 20. The drain line 54 preferably extends a distance into the lower portion of the interior of the reservoir 30 so that the discharge nozzle 52 of the drain line 54 disperses the liquid in a mixing manner to encourage heat exchange.

A drain pump 50 is fluidly connected to the drain line 54 to facilitate a transfer of the liquid from the thermal management unit 20 to the reservoir 30. The inlet of the drain pump 50 is connected to an outlet port 28 of the thermal management unit 20 and the outlet of the drain pump 50 is connected to the reservoir 30.

Figure 5:
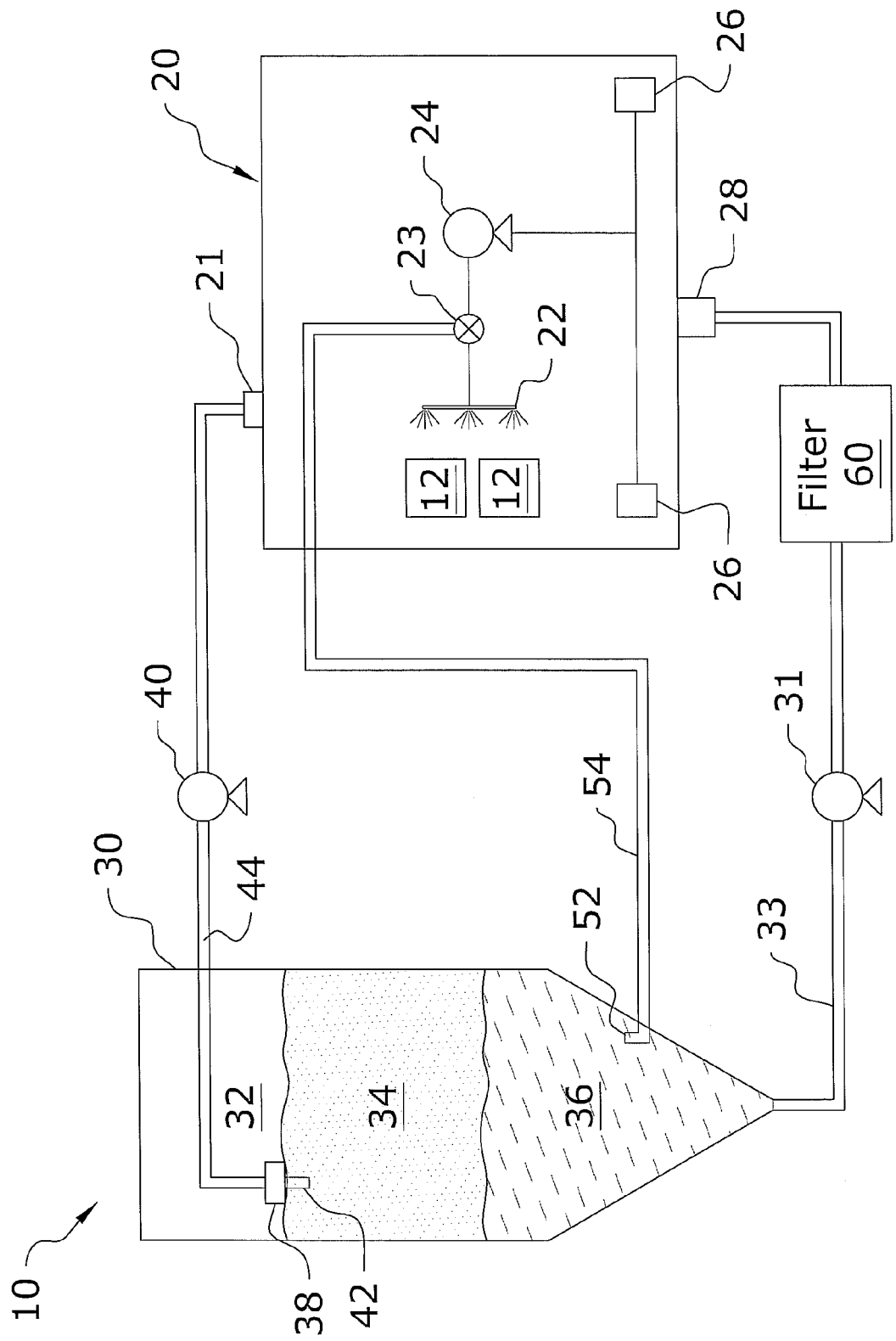
FIG. 5 is a block diagram illustrating an alternative embodiment of the liquid thermal management purging system.

In an alternative embodiment shown in FIG. 5 of the drawings, a third pump 24 within the thermal management unit 20 that is used to provide pressurized liquid coolant 36 to the spray unit 22 is used to remove the liquid from within the thermal management unit 20. As shown in FIG. 5, a valve 23 is fluidly connected between the third pump 24 and the spray unit 22 along with the drain line 54 fluidly connected to the valve 23. The valve 23 thereby controls the flow of the liquid being drawn into the third pump 24 to either the spray units 22 (i.e. liquid coolant 36) or to the reservoir 30 (i.e. liquid coolant 36, displacement liquid 34 or both).

I. Control System

Figure 6:
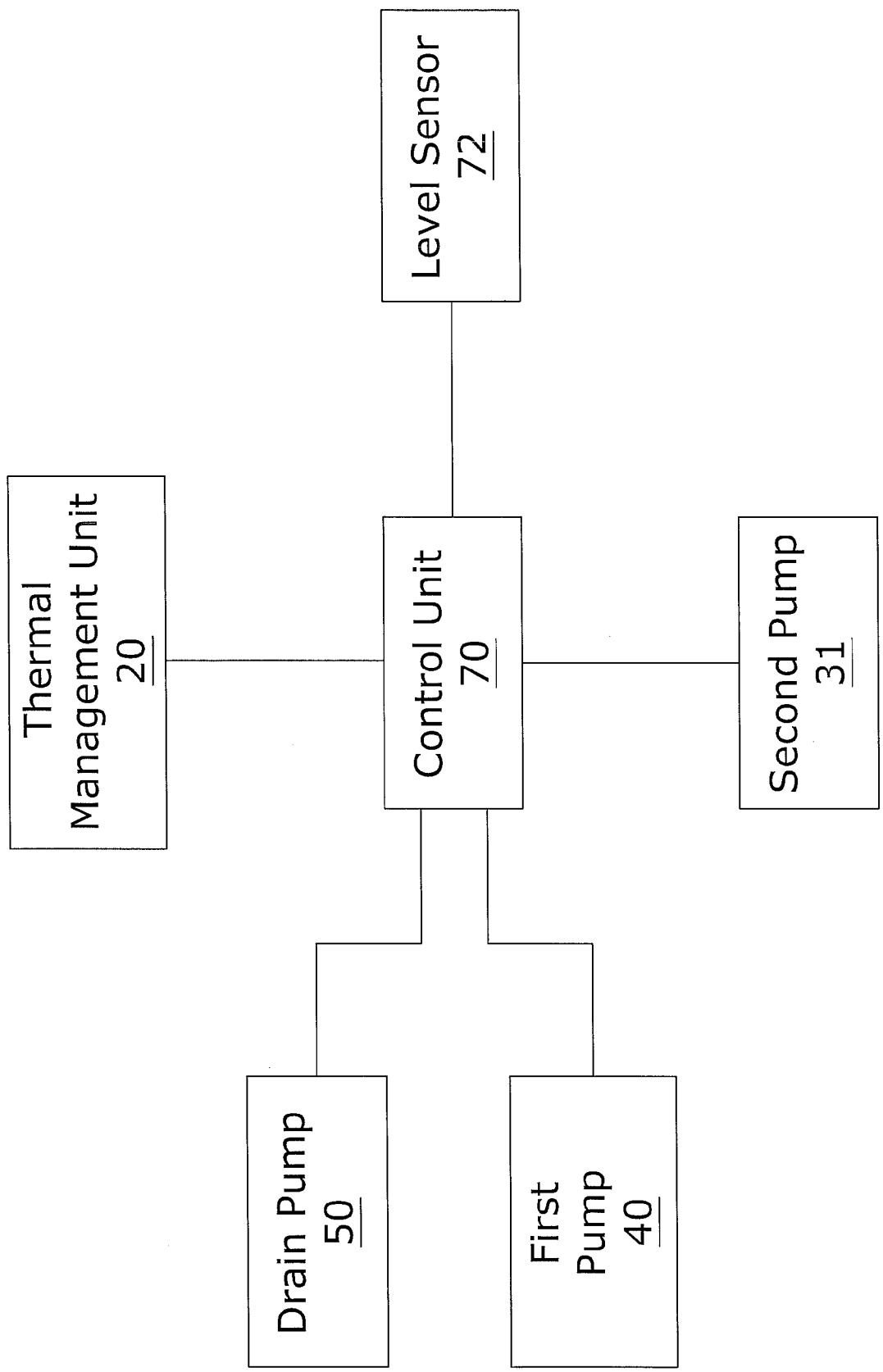
FIG. 6 is a block diagram illustrating the communications with the various components with a control unit.
Figure 7:
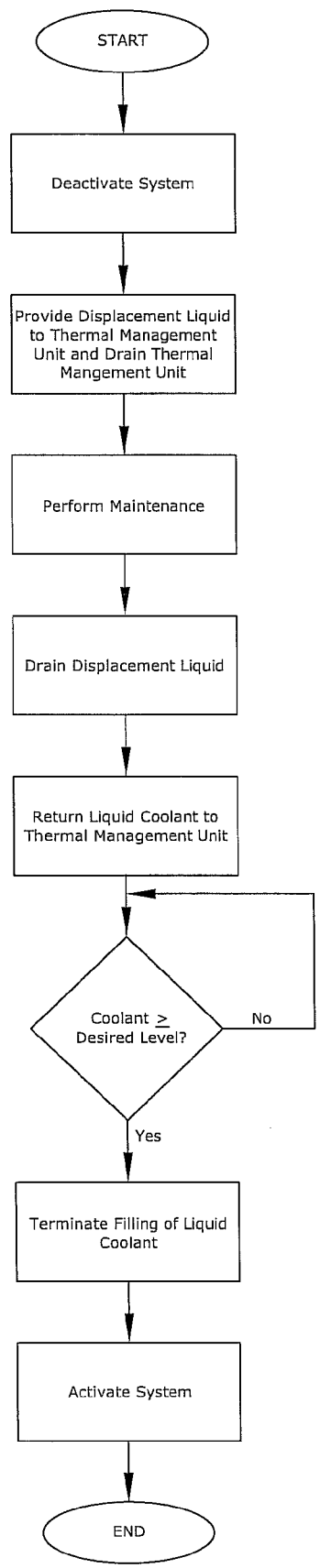
FIG. 7 is a flowchart illustrating the overall operation of the liquid thermal management purging system.

As shown in FIG. 6 of the drawings, a control unit 70 is in communication with the valve 23, the thermal management unit 20, the first pump 40, the second pump 31, the drain pump 50, a level sensor 72 within the thermal management unit 20 and a level sensor 72 within the reservoir 30. The control unit 70 may be comprised of any device capable of communicating with and controlling the various electrical devices (e.g. pumps, sensors). The control unit 70 determines the overall operation of the system including the flow of displacement liquid 34 or liquid coolant 36 from the reservoir 30 to the thermal management unit 20 or the flow of liquid from the thermal management unit 20.

The level sensor 72 is any fluid sensor that is able to determine the level of liquid within the thermal management unit 20. The level sensor 72 is used to determine if the thermal management unit 20 has a sufficient level of liquid coolant 36 during refilling of the thermal management unit 20 and to prevent overfilling of the thermal management unit 20 with the displacement liquid 34. Various other sensors may be utilized to measure various other conditions such as but not limited to temperature sensors and pressure sensors.

J. Operation of Preferred Embodiment i. Initial Operations.

In use, the thermal management unit 20 is filled with liquid coolant 36 to a desired level and is operated as a normal thermal management unit 20 to thermally manage one or more heat producing devices 12. During the operation of the thermal management unit 20, one or more devices may malfunction, require repairs, require scheduled maintenance or other maintenance issues that require opening of the thermal management unit 20 (or other devices connected to the thermal management unit 20).

ii. Liquid Coolant Removal and Displacement Liquid Input.

When a maintenance issue is encountered, the control unit 70 deactivates the thermal management unit 20 and the heat producing devices 12 (e.g. electronic devices). The outlet port 28 is opened and the drain pump 50 is activated to draw the liquid coolant 36 from the thermal management unit 20. The liquid coolant 36 is transferred to the reservoir 30 and the liquid coolant 36 partially mixes with the displacement liquid 34 while eventually settling via gravity separation to the lower portion of the reservoir 30 as illustrated in FIG. 3 of the drawings.

Figure 3:
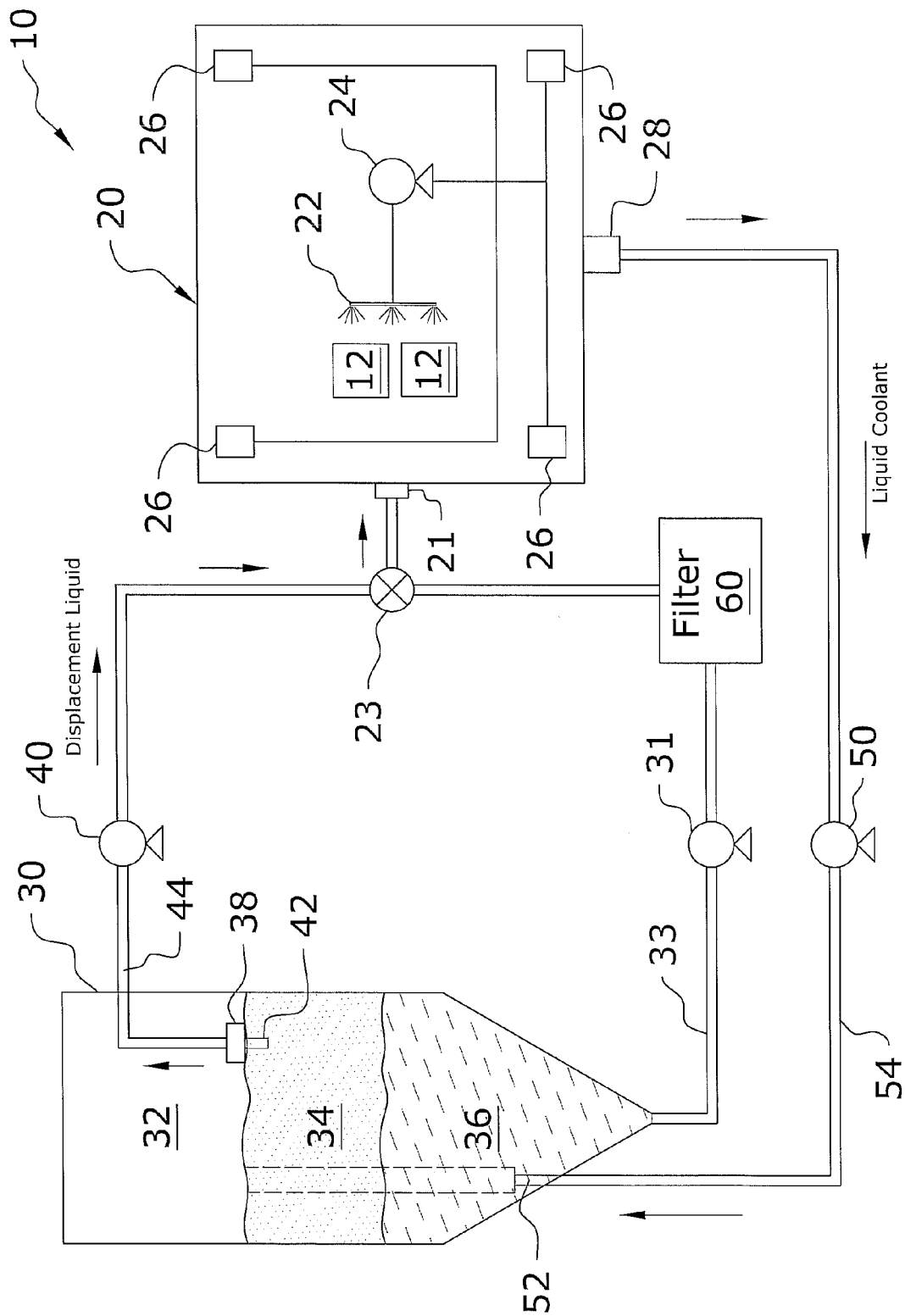
FIG. 3 is a block diagram illustrating the removal of the liquid coolant from the thermal management unit and the displacement of the liquid coolant with the displacement liquid.

After the liquid coolant 36 has been substantially removed from the thermal management unit 20, the drain pump 50 is deactivated, the outlet port 28 is then closed and the first pump 40 is activated drawing the displacement coolant from the upper portion of the reservoir 30 as further shown in FIG. 3 of the drawings. The displacement liquid 34 enters the thermal management unit 20 and covers any remaining liquid coolant 36 within the thermal management unit 20 to prevent evaporation of the liquid coolant 36 when the thermal management unit 20 (or a connected device like a heat exchanger) is opened for the maintenance.

When the thermal management unit 20 is filled to a desired level with the displacement liquid 34, the first pump 40 is deactivated and the user is then able to physically open the thermal management unit 20 for repairs without fear of losing liquid coolant 36 or being exposed to the liquid coolant 36. Once the maintenance is performed, the user then closes the thermal management unit 20.

iii. Displacement Liquid Removal and Liquid Coolant Return.

The outlet port 28 is then opened and the drain pump 50 is activated to draw the displacement liquid 34 (and any remaining liquid coolant 36) from the thermal management unit 20. The displacement liquid 34 is transferred to the reservoir 30 and the displacement partially mixes with the liquid coolant 36 while eventually rising via gravity separation to the upper portion of the reservoir 30 as illustrated in FIG. 4 of the drawings.

Figure 4:
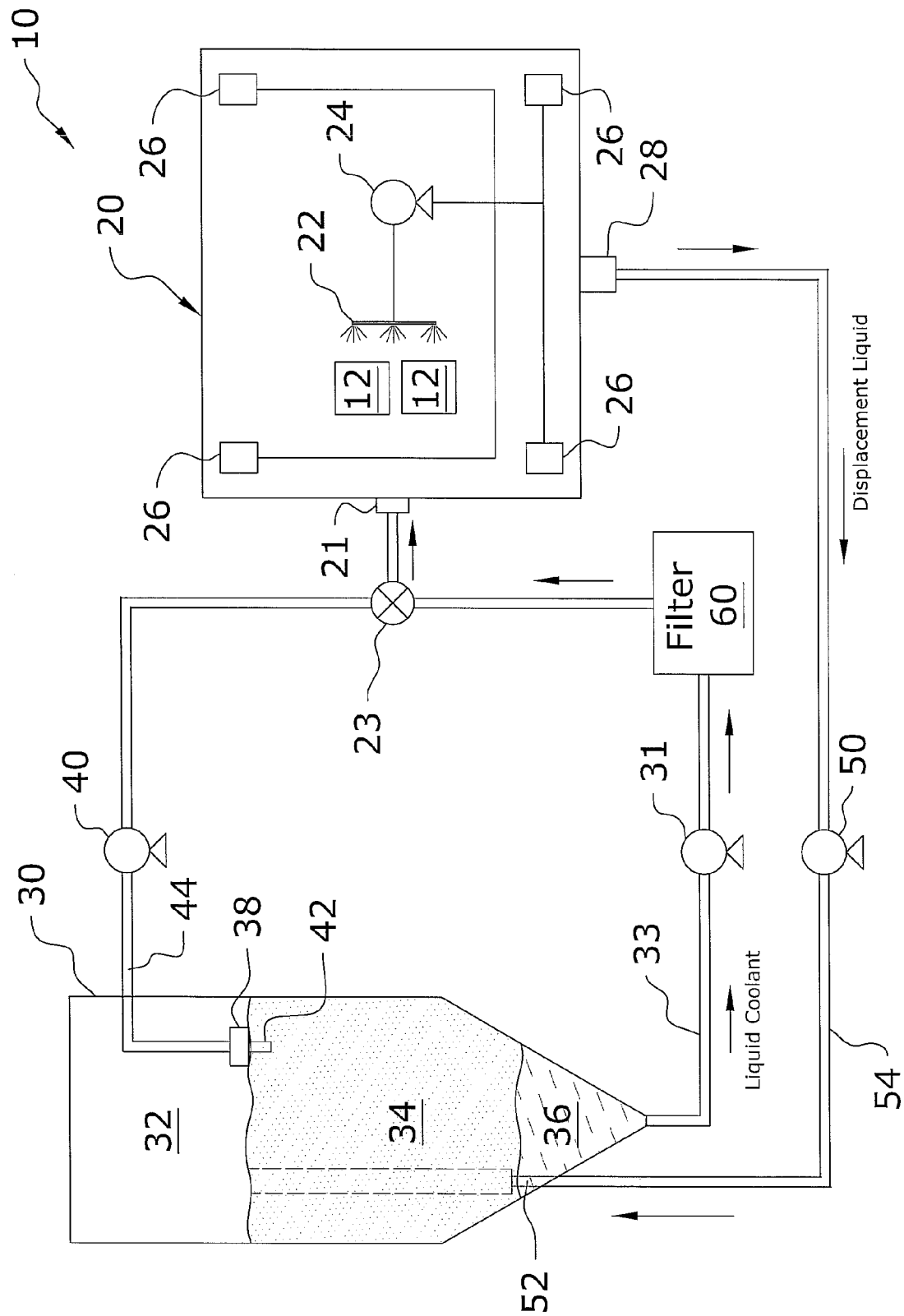
FIG. 4 is a block diagram illustrating the removal of the displacement liquid from the thermal management unit and the returning of the liquid coolant to the thermal management unit.

After the displacement liquid 34 has been substantially removed from the thermal management unit 20, the drain pump 50 is deactivated, the outlet port 28 is then closed and the second pump 31 is activated drawing the liquid coolant 36 from the lower portion of the reservoir 30 as further shown in FIG. 4 of the drawings. The liquid coolant 36 enters the thermal management unit 20 and continues to fill the thermal management unit 20 until the level sensor 72 determines that a desired level of liquid coolant 36 is present within the thermal management unit 20. The second pump 31 is then deactivated along with the thermal management unit 20 and heat producing devices 12 being activated.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A liquid thermal management purging system, comprising:
    a reservoir;
    a liquid coolant within said reservoir;
    a displacement liquid within said reservoir;
    wherein said displacement liquid is immiscible with said liquid coolant;
    wherein said displacement liquid has a density different from said liquid coolant to allow gravity separation of said liquid coolant and said displacement liquid within said reservoir;
    a thermal management unit;
    a first line fluidly connected to said reservoir in a location to draw said displacement liquid;
    a first pump fluidly connected to said first line and said thermal management unit to provide said displacement liquid to said thermal management unit;
    a second line fluidly connected to said reservoir in a location to draw said liquid coolant; and
    a second pump fluidly connected to said second line and said thermal management unit to provide said liquid coolant to said thermal management unit.

2. The liquid thermal management purging system of claim 1, wherein said liquid coolant has a density of approximately 0.0625 pounds per cubic inch at 25° Celsius and 1 atmosphere pressure.

3. The liquid thermal management purging system of claim 1, wherein said liquid coolant is comprised of a dielectric.

4. The liquid thermal management purging system of claim 1, wherein said liquid coolant is comprised of a perfluorocarbon or a hydrofluoroether.

5. The liquid thermal management purging system of claim 1, wherein said displacement liquid is comprised of low GWP dielectric liquid.

6. The liquid thermal management purging system of claim 1, including a valve fluidly connected to a discharge end of said first line and a discharge end of said second line, wherein said valve controls a flow of liquid coolant from said second line and a flow of said displacement coolant from said first line to said thermal management unit.

7. The liquid thermal management purging system of claim 6, including a control unit in communication with said valve.

8. The liquid thermal management purging system of claim 1, including a filter within said second line to remove said displacement liquid from said liquid coolant.

9. The liquid thermal management purging system of claim 1, wherein a density of said liquid coolant is higher than a density of said displacement liquid, wherein said liquid coolant gravity separates to a lower portion of said reservoir and wherein said displacement liquid gravity separates to above said liquid coolant.

10. The liquid thermal management purging system of claim 9, wherein said second line is fluidly connected to said lower portion of said reservoir.

11. The liquid thermal management purging system of claim 9, including a float attached to said first line, wherein said float is buoyant within said displacement liquid, wherein said first line extends below said float, and wherein an intake opening of said first line extends into said displacement liquid but not said liquid coolant.

12. The liquid thermal management purging system of claim 1, including a drain line fluidly connected to said thermal management unit and said reservoir to transfer a liquid within said thermal management unit to said reservoir.

13. The liquid thermal management purging system of claim 12, including a drain pump fluidly connected to said drain line to facilitate a transfer of said liquid from said thermal management unit to said reservoir.

14. The liquid thermal management purging system of claim 12, wherein said thermal management unit includes a third pump, a valve fluidly connected to a discharge port of said third pump, and a coolant dispensing unit fluidly connected to said valve, wherein said drain line is fluidly connected to said valve and wherein said valve directs a flow of liquid from said third pump to either said coolant dispensing unit or said drain line.

15. The liquid thermal management purging system of claim 14, including at least one heat producing device thermally managed by said spray unit within said thermal management unit.

16. The liquid thermal management purging system of claim 14, wherein said coolant dispensing unit is comprised of a spray unit.

17. A liquid thermal management purging system, comprising:
   a reservoir;
   a liquid coolant within said reservoir;
   a displacement liquid within said reservoir;
   wherein said displacement liquid is immiscible with said liquid coolant;
   wherein said displacement liquid is has a GWP less than 5,000 (100-yr-ITH);
   wherein said displacement liquid has a density different from said liquid coolant to allow gravity separation of said liquid coolant and said displacement liquid within said reservoir;
   wherein a density of said liquid coolant is higher than a density of said displacement liquid, wherein said liquid coolant gravity separates to a lower portion of said reservoir and wherein said displacement liquid gravity separates to above said liquid coolant;
   a thermal management unit;
   a first line fluidly connected to said reservoir in a location to draw said displacement liquid;
   a first pump fluidly connected to said first line and said thermal management unit to provide said displacement liquid to said thermal management unit;
   a second line fluidly connected to said reservoir in a location to draw said liquid coolant;
   wherein said second line is fluidly connected to said lower portion of said reservoir;
   a second pump fluidly connected to said second line and said thermal management unit to provide said liquid coolant to said thermal management unit;
   a drain line fluidly connected to said thermal management unit and said reservoir to transfer a liquid within said thermal management unit to said reservoir; and
   a drain pump fluidly connected to said drain line to facilitate a transfer of said liquid from said thermal management unit to said reservoir.

18. The liquid thermal management purging system of claim 17, wherein said liquid coolant has a density of approximately 0.0625 pounds per cubic inch at 25° Celsius and 1 atmosphere pressure.

19. The liquid thermal management purging system of claim 17, wherein said liquid coolant is comprised of a dielectric liquid.

20. The liquid thermal management purging system of claim 17, wherein said liquid coolant is comprised of a perfluorocarbon or a hydrofluoroether.

21. The liquid thermal management purging system of claim 17, wherein said displacement liquid is comprised of a low GWP liquid.

22. The liquid thermal management purging system of claim 17, including a valve fluidly connected to a discharge end of said first line and a discharge end of said second line, wherein said valve controls a flow of liquid coolant from said second line and a flow of said displacement coolant from said first line to said thermal management unit.

23. The liquid thermal management purging system of claim 22, including a control unit in communication with said valve.

24. The liquid thermal management purging system of claim 17, including a filter within said second line to remove said displacement liquid from said liquid coolant.

25. The liquid thermal management purging system of claim 17, including a float attached to said first line, wherein said float is buoyant within said displacement liquid, wherein said first line extends below said float, and wherein an intake opening of said first line extends into said displacement liquid but not said liquid coolant.

* * * * *